United States Patent

Brinkman, Jr.

[15] 3,668,169

[45] June 6, 1972

[54] PROCESS FOR PIGMENTING LINEAR SATURATED POLYESTERS

[72] Inventor: George H. Brinkman, Jr., Gulf Breeze, Fla.

[73] Assignee: Monsanto Company, St. Louis, Mo.

[22] Filed: July 24, 1970

[21] Appl. No.: 58,193

Related U.S. Application Data

[63] Continuation-in-part of Ser. No. 709,681, Mar. 4, 1968, abandoned.

[52] U.S. Cl. ................260/31.8 XA, 260/33.8 R, 260/40 R
[51] Int. Cl. ........................................C08g 51/40, C08g 51/02
[58] Field of Search................260/40 R, 31.8 XA, 34.2, 33.8

[56] References Cited

UNITED STATES PATENTS

| | | | |
|---|---|---|---|
| 2,757,158 | 7/1956 | Darby et al | 260/31.8 XA |
| 3,055,297 | 9/1962 | Leeds | 260/31.8 XA UX |
| 3,249,574 | 5/1966 | Meyer | 260/31.8 XA X |
| 3,514,651 | 5/1970 | Jarrett | 260/40 X |

*Primary Examiner*—Lewis T. Jacobs
*Attorney*—Stanley M. Tarter, George R. Beck, Neal E. Willis and Elmer J. Fischer

[57] ABSTRACT

A pigment can be uniformly distributed throughout a linear saturated polyester without substantial degradation of the polyester by combining about 100 parts by weight of the polyester with about 0.1–4 parts by weight of a slurry containing about 2–50 percent by weight of the pigment and about 50–98 percent by weight of a chlorinated biphenyl or diester of phthalic acid and them mixing the combined polyester and slurry above the melting point of the polyester.

8 Claims, No Drawings

PROCESS FOR PIGMENTING LINEAR SATURATED POLYESTERS

CROSS-REFERENCE TO RELATED APPLICATION

This application is a continuation-in-part of my copending application Ser. No. 709,681 which was filled on Mar. 4, 1968, now abandoned.

BACKGROUND OF THE INVENTION

Many different procedures for pigmenting thermoplastic polymers have been proposed. In general, the main objectives thereof include a uniform distribution of the pigment throughout the polymer, the avoidance of substantial polymer degradation and minimization of the number of steps in which the pigment is present during preparation and processing of the polymer.

Examples of such procedures are set forth in British Pat. No. 504,714 (granted to E.I. DuPont de Nemours and Company on Apr. 28, 1939) which discloses that a finely divided pigment may be added to a molten polymer in the solid state or in the form of a solution or suspension and then precipitated by removal of the solvent. From the need for removal of the solvent, it appears that the patentee contemplated the use of only such solvents and/or large amounts thereof which, if not removed, would adversely affect the properties of the pigmented polymer. No specific solvents or amounts thereof were disclosed as being suitable for use in the pigmentation of polymers other than polyamides by that procedure. Moreover, the patentee disclosed that to insure a uniform distribution of the pigment in the polymer, it was preferable to include the pigment in the monomeric substances employed in the synthesis of the polymer (thus effectively maximizing the number of steps in which the pigment is present during preparation and processing of the polymer).

It should be recognized that most pigments can be uniformly distributed throughout a thermoplastic polymer if the pigment and the polymer are thoroughly mixed for a long enough time but that such mixing tends to degrade some polymers and thereby adversely affect the properties (e.g. tensile strength) of products made therefrom. Although various procedures (such as those of British Pat. No. 504,714) may provide a uniform distribution of the pigment without substantial degradation of various other polymers, those procedures have been generally regarded as inadequate to provide those results when used with the linear saturated polyesters which are well known as much more susceptible to degradation by mixing. See, for example, Canadian Pat. No. 485,678 (granted to Edmund Waters and Leonard Wood on Aug. 12, 1952) which discloses after referring to the procedures of British Pat. No. 504,714 that when a finely divided pigment is introduced into a linear saturated polyester such as polyethylene terephthalate, the pigment shows a remarkable tendency toward non-uniform distribution in the polyester. It is also known that molten linear saturated polyesters are severely degraded by mixing in the presence of even very small proportions of many compounds which could be used as vehicles for the pigment (e.g. water, aryl sulfonamides, triphenyl phosphite, alcohols such as ethylene glycol, etc.). In fact, the difficulties involved in pigmenting a linear saturated polyester appeared sufficiently formidable that the patentees of Canadian Pat. No. 485,678 and British Pat. No. 762,478 (granted to Imperial Chemical Industries Limited on Nov. 28, 1956) sought to avoid those difficulties completely by substituting polyester-soluble dyes for the pigments.

More recently, it has become common practice to pigment various thermoplastic polymers by the so-called masterbatch method (as described in U.S. Pat. No. 3,352,952 granted to John A. Marr on Nov. 14, 1967) wherein a minor portion of the polymer to be pigmented is thoroughly melt-mixed with a high proportion of the pigment and solid particles of resulting masterbatch are then thoroughly melt-mixed with the remainder of the polymer. Although that method permits convenient variation of the proportion of pigment in the polymer, it has the disadvantage of requiring two polymer-mixing steps which are expensive on a commercial scale. In the pigmentation of linear saturated polyesters which are normally degraded by melting, that method has the further disadvantage of including an extra melting step which adversely affects the properties of the pigmented polyester.

In the absence of a process which can be carried out without one or more of the disadvantages of the procedures described hereinbefore, a process whereby a pigment can be uniformly distributed throughout a linear saturated polyester without substantial degradation of the polyester or the need for a large amount of a solvent or vehicle which would have to be thereafter removed from the pigmented polyester is highly desirable and it is an object of this invention to provide such a process.

SUMMARY OF THE INVENTION

It has now been discovered that a pigment can be uniformly distributed throughout a linear saturated polyester without substantial degradation of the polyester by combing about 100 parts by weight of the linear saturated polyester with from about 0.1 to about 4 parts by weight of a slurry containing from about 2 percent and about 50 percent by weight of a pigment and from about 50 percent and about 98 percent by weight of at least one chlorinated biphenyl or diester of phthalic acid and then mixing the combined polyester and slurry at a temperature above the melting point of the polyester.

DETAILED DESCRIPTION OF THE INVENTION

The polyesters that are most advantageously pigmented by the process of this invention are the linear saturated polyesters produced by polycondensation of at least one dicarboxylic acid and at least one glycol (or polyester-forming derivatives thereof) devoid of olefinic unsaturation. Especially suitable are the polycondensation products of aromatic dicarboxylic acids and alkylene glycols, such as the polyalkylene terephthalates and isophthalates in which the alkylene groups contain from two to about six carbon atoms. The invention is also applicable to copolymers containing such linear saturated polyesters (e.g. copolyesters of terephthalic and isophthalic acids) and the term "linear saturated polyester" as used herein is intended to cover both homopolymers and copolymers of the types just described.

The invention is also most suitably carried out by combining the pigment slurry with a polyester having properties (particularly average molecular weight) sufficient to form a self-supporting fiber or film and thereby avoiding the need for the presence of the pigment during the condensation reaction of the monomeric precursors of the polyester. Those properties are normally present when the polyester has a specific viscosity of at least about 0.25 (and generally not more than about 0.6) as calculated using the formula $$Nsp = (T_1 1 T_2) - 1$$

wherein $T_1$ is the time of flow of a given volume of a 0.5 percent by weight solution of the polyester in a solvent composed of two parts by weight of phenol and one part by weight of 2,4,6-trichlorophenol by force of gravity through a capillary viscosity tube at 25° C. and $T_2$ is the time of flow of the same volume of the solvent alone by force of gravity through the same capillary viscosity tube at 25° C. The polyester and the pigment slurry can be advantageously combined while the polyester is substantially completely solid (e.g. in the form of solid particles produced in a batch process for storage of the polyester prior to melting and subsequent extrusion in the form of fibers or film and referred to generally as chips) or they can be combined while the polyester is substantially molten (e.g. in a continuous polymerization-extrusion process or after partial or complete melting of the solid particles produced in the aforementioned batch process).

The chlorinated biphenyls most desirably employed in the process of this invention are those containing from about 20 percent to about 70 percent by weight of chlorine although others may be satisfactory in some cases. The phthalic acid diesters most desirably (but not exclusively) employed are those having the formula

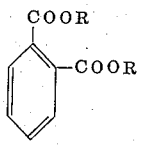

wherein each R is alkyl (e.g. $C_1$-$C_6$ alkyl and preferably n-butyl) or aryl (preferably benzyl) or alkaryl (e.g $C_1$-$C_4$ alkylbenzyl). Such chlorinated biphenyls and/or diesters of phthalic acid form conveniently-handled slurries with heat-stable pigments known in the art to be suitable for polyester pigmentation, such as lead chromate, lead sulfate, lead phosphate, copper phthalocyanine, chlorinated copper phthalocyanine, titanium dioxide, cadmium sulfide, cobalt sulfide, ferric oxide, carbon black, lithopone, etc.

To reduce the tendency of the pigment slurry to settle out before use, it may also be desirable to include enough of a dispersing agent of any well-known type to obtain a good dispersion. The proportions of pigment, dispersing agent and biphenyl or diester can be varied widely to provide a conveniently-handled slurry which is then combined with the polyester in the proportion required to provide the desired level of pigmentation. Typical slurry compositions include 2 to 50 percent (preferably 10 to 30 percent) of the pigment, 0.5 to 2 percent of the dispersing agent and 50 to 98 percent (preferably 70 to 90 percent) of the chlorinated biphenyl or phthalic acid diester. The proportions in which such a slurry is combined with the polyester are from about 0.1 to about 4 (generally from about 0.5 to about 3) parts by weight of the slurry per 100 parts by weight of the polyester, from which it can be seen that only a very small proportion of the chlorinated biphenyl or phthalic acid diester is required for use in pigmentation of a linear saturated polyester by the process of this invention. In fact, the required proportion of the chlorinated biphenyl or phthalic acid diester is so small that the properties of the pigmented polyester are not substantially adversely affected if the chlorinated biphenyl or diester of phthalic acid is not removed from the polyester after its use in the process of this invention.

In normal operation, the slurry is prepared by first combining the dispersing agent with the chlorinated biphenyl or phthalic acid diester and then adding the pigment and agitating the resulting mixture until a good dispersion is obtained (e.g. for 20–30 minutes). Thereafter, the slurry can be metered to the inlet or interior of a heated mixing extruder to which the polyester is also fed in molten or (more generally) solid particulate form or solid particles of the polyester can be coated with the slurry (e.g. in a rotating drum or other mixing apparatus) before feeding the slurry-coated particles to the extruder. As used herein, the term "mixing extruder" is intended to mean an extruder, usually of the screw type, in which the polymer and slurry are mixed with sufficient thoroughness to achieve a uniform distribution of the pigment throughout the polyester.

As aforesaid, the chlorinated biphenyls and phthalic acid diesters employed in the process of this invention have no substantial adverse effect on the properties of the polyester with which they are combined or of fibers or films produced from such polyesters. For example, when solid polyethylene terephthalate particles containing 0.2 percent $TiO_2$ as a delusterant and having a specific viscosity of 0.38 were dried in a vacuum dryer to a moisture content of less than 0.05 percent and then melted in a screw-type mixing extruder, pumped through a spinning pack having a 560 hole spinneret, wound up at 1,120 yards per minute and then drawn, the drawn yarn had the properties shown in Table I. When additional yarn was prepared in an identical manner except that a chlorinated biphenyl or phthalic acid diester was metered into the extruder inlet at the rate of one percent by weight of the polymer flow through the extruder, the properties of the drawn yarn, as shown in Table I, were substantially the same as those of the yarn containing no chlorinated biphenyl or phthalic acid diester.

TABLE I

| | No Biphenyl or Diester | n-Butyl Benzyl Phthalate | Chlorinated Biphenyl |
|---|---|---|---|
| Percent Elongation | 24.2 | 24.3 | 20.2 |
| Specific Viscosity of Yarn | 0.40 | 0.39 | 0.37 |
| Drawn Yarn Properties | | | |
| Denier Per Filament | 1.75 | 1.95 | 1.75 |
| Tenacity, Grams Per Denier | 5.6 | 5.6 | 5.8 |
| Color | | | |
| Brightness | 86.0 | 84.1 | 84.2 |
| Whiteness | 84.0 | 88.1 | 85.4 |

The following examples are included to illustrate the use of the process of this invention for pigmenting a linear saturated polyester and are not representative of any limitations on the scope of the invention. Proportions are by weight except where noted otherwise.

EXAMPLE I

A pigment slurry was prepared by combing 0.9 part of Duomeen TDO (a dispersing agent consisting essentially of N-tallow-trimethylene-diamine dioleate) and 79.1 parts of n-butyl benzyl phthalate with 14 parts of DuPont Shading Yellow Y–493–D (75–80 percent lead chromate with lead phosphate and lead sulfate added) and 6 parts of DuPont Ramapo Green G GP–775–D (resonated copper phthalocyanine) and agitating the resulting mixtures for 30 minutes in a Cowles Dissolver. When polyester filaments were prepared as described just before this example and the slurry of Ramapo Green and Shading Yellow pigments was metered into the extruder inlet at a rate of two parts per 98 parts of the polyester, the pigment was uniformly dispersed throughout the polyester providing filaments having good level color and substantially the same tenacity as filaments identically produced except for omission of the pigment slurry. After the flow of slurry was initiated, the time required to reach uniform pigmentation of the polyester was approximately 10 minutes.

EXAMPLE II

When the procedure of Example I was repeated with the exception that the pigment slurry contained approximately 80 parts of a mixture of chlorinated biphenyls containing an average of 32 percent by weight of chlorine instead of the n-butyl benzyl phthalate, the results were substantially the same. That is, the pigment from the slurry was uniformly distributed throughout the polyester providing filaments having good level color and no substantial degradation within about 10 minutes after the flow of pigment slurry into the extruder was begun.

EXAMPLE III

When the procedure of Examples I and II are repeated with the exception that the pigment slurries are fed to the interior of the mixing extruder and therein combined with the polyester while it is substantially completely molten, the results are the same. That is, the pigment from the slurry is uniformly distributed throughout the polyester providing filaments having good level color and substantially the same tenacity as filaments identically produced except for omission of the pigment slurry.

COMPARATIVE EXAMPLE

WHen the procedures of Examples I–III are repeated with the exception that the pigment slurry contains about 80 parts of ethylene glycol, triphenyl phosphite or water instead of the chlorinated biphenyl or phthalic acid diester, the pigmented polyesters are so degraded that they do not have an average molecular weight sufficient to form a self-supporting film or fiber.

I claim:

1. A process which comprises combining about 100 parts by weight of a linear saturated polyester with from about 0.1 to about 4 parts by weight of a slurry containing from about 2 percent to about 50 percent by weight of a pigment and from about 50 percent to about 98 percent by weight of a compound selected from the group consisting of: (1) a chlorinated biphenyl; (2) a compound having the formula

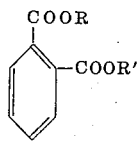

wherein R is a radical selected from the group consisting of $C_1$–$C_6$ alkyl, benzyl and ($C_1$–$C_4$ alkyl) benzyl.

2. The process of claim 1 wherein the chlorinated biphenyl contains between about 20 percent and about 70 percent by weight of chlorine.

3. The process of claim 1 wherein the polyester has an average molecular weight sufficient to form a self-supporting fiber or film.

4. The process of claim 1 wherein the polyester is a polyalkylene terephthalate or isophthalate in which the alkylene groups contain from two to about six carbon atoms.

5. The process of claim 1 wherein the pigment is lead chromate, lead sulfate, lead phosphate, copper phthalocyanine, chlorinated copper phthalocyanine, titanium dioxide, cadmium sulfide, cobalt sulfide, ferric oxide, carbon black or lithopone.

6. The process of claim 1 wherein the combing of the polyester and the slurry is carried out while the polyester is substantially completely solid.

7. The process of claim 1 wherein the combining of the polyester and the slurry is carried out while the polyester is substantially molten.

8. The process of claim 1 wherein the radical R is selected from the group consisting of n-butyl and n-butyl benzyl.

* * * * *